United States Patent [19]

Yano

[11] Patent Number: 4,764,886

[45] Date of Patent: Aug. 16, 1988

[54] BIT SLICE - TYPE ARITHMETIC ADDER CIRCUIT USING EXCLUSIVE-OR LOGIC FOR USE WITH A LOOK-AHEAD CIRCUIT

[75] Inventor: Seiken Yano, Tokyo, Japan

[73] Assignee: NEC Corporation, Tokyo, Japan

[21] Appl. No.: 763,117

[22] Filed: Aug. 7, 1985

[30] Foreign Application Priority Data

Aug. 7, 1984 [JP] Japan ................................ 59-165263

[51] Int. Cl.[4] ................................................ G06F 7/50
[52] U.S. Cl. .................................................... 364/787
[58] Field of Search ................................ 364/786, 787

[56] References Cited

U.S. PATENT DOCUMENTS

| | | | |
|---|---|---|---|
| 4,504,924 | 3/1985 | Cook et al. | 364/787 |
| 4,584,661 | 4/1986 | Grundland | 364/787 |
| 4,623,981 | 11/1986 | Wolrich et al. | 364/787 |

*Primary Examiner*—David H. Malzahn
*Attorney, Agent, or Firm*—Sughrue, Mion, Zinn, Macpeak, and Seas

[57] ABSTRACT

An adder circuit of bit slice type comprises a first circuit for receiving first and second binary input signals A and B of a certain bit length (M+1) and producing parallel output signals, a second circuit means for producing carry signals, and a third circuit for producing the result of the addition of said first and second binary input signals.

The adder circuit is characterized in that the first circuit comprises a plurality of arithmetic and logical circuits each receiving two pairs of the input bit signals ($A_{2n+1}$, $A_{2n}$, $B_{2n+1}$, $B_{2n}$) which correspond to the contents of the two adjacent bits of said input binary signals. The arithmetic and logical circuit of the first circuit outputs signals $G_{2n+1}$, $P_{2n+1}$, $X_{2n+1}$, $X_{2n}$ and $Y_{2n}$ of the following logical formula.

$$G_{2n+1}=A_{2n+1}B_{2n+1}+(A_{2n+1}\oplus B_{2n+1})\cdot A_{2n}B_{2n}$$

$$P_{2n+1}=(A_{2n+1}\oplus B_{2n+1})\cdot(A_{2n}\oplus B_{2n})$$

$$X_{2n+1}=A_{2n+1}\oplus B_{2n+1}$$

$$X_{2n}=A_{2n}\oplus B_{2n}$$

$$Y_{2n}=A_{2n}\cdot B_{2n}$$

Wherein 2n=0, 2, 4, . . . , M, and 2n+1=1, 3, . . . , (M−1).

The signals $G_{2n+1}$, $P_{2n+1}$ may be produced with the following logical formula:

$$G_{2n+1}=A_{2n+1}B_{2n+1}+(A_{2n+1}+B_{2n+1})\cdot A_{2n}B_{2n}$$

$$P_{2n+1}=(A_{2n+1}+B_{2n+1})\cdot(A_{2n}+B_{2n}).$$

22 Claims, 14 Drawing Sheets

FIGURE 5 (a) PRIOR ART
Xi
Ci
Si = Xi ⊕ Ci
FIGURE 5 (b) PRIOR ART
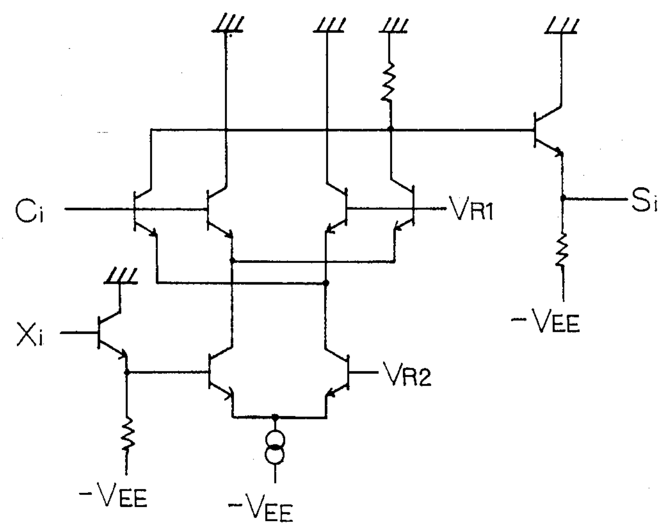

BIT SLICE - TYPE ARITHMETIC ADDER CIRCUIT USING EXCLUSIVE-OR LOGIC FOR USE WITH A LOOK-AHEAD CIRCUIT

FIELD OF THE INVENTION

The present invention relates to an adder circuit. More particularly, the present invention relates to an adder circuit of bit slice type effectively incorporated in, for example, an arithmetic and logic unit of a data processor.

DESCRIPTION OF THE PRIOR ART

An adder of bit slice architecture is constructed by concatenating a number of adder circuits in parallel. Each adder circuit of bit slice type has provision for two binary inputs and carry signals from the immediately preceding stage of addition and is capable of generating sum and carry signals to next stage of addition. In such an adder circuit, since the processing of the data of the upper order position is influenced by the result of the addition of the data of the lower order position, it is important how to propagate the influence of the addition of the data of the lower order position to the processing of the upper order position in order to fabricate a processing unit of having a high operation speed. For this purpose, the carry lookahead system is widely employed.

The carry lookahead system has been developed to shorten the execution time of add operations by decreasing the number of elements through which the carry signals pass in order to shorten the propagation time thereof. In the carry lookahead system, the adder is divided to a plurality of groups of adder circuits each processing data of M bits length. Each group of adder circuits produces a carry generate signal. This signal indicates the generation of a carry to the next upper group of adder circuits due to the result of addition of only the input data to this group. Each group also produces a carry propagate signal. This signal indicates the occurrence of propagation of a carry from the immediately preceding group of adder circuits to the next upper group of adder circuits when the immediately preceding group produces a carry. The carry lookahead circuit receives the carry generate signal and the carry propagate signal from each group of adder circuits and a carry signal to the least significant bit, and produces a carry signal to each group of adder circuits.

FIG. 1 illustrates a block diagram of an adder circuit of bit slice type in the prior art to which a carry look ahead circuit can be coupled. The adder circuit shown in FIG. 1 comprises first circuit means 11 for receiving first and second input bit signals $A_i$ and $B_i$ each corresponding to a certain bit of an addend binary data A and an augend binary data B and for outputting signals $X_i$ and $Y_i$, second circuit means 12 for receiving the output signals $X_i$ and $Y_i$ from said first circuit means and an external carry signal $C_{IN}$ from an external source to produce internal carry signals $C_i$ for each bit position of the inputted signals and a carry generate signal G and a carry propagate signal P for the inputted addend binary data A and the augend binary data B, and third circuit means 13 for receiving the output signal $X_i$ from the first circuit means 11 and the internal carry signal $C_i$ from the second circuit means 12 to produce a sum signal $S_i$.

In the adder circuit shown in FIG. 1, the signals $X_i$, $Y_i$, $C_i$, $S_i$, P and G are expressed according to the following logical formula:

$$X_i = A_i \oplus B_i$$

$$Y_i = A_i \cdot B_i$$

$$C_{i+1} = Y_i + X_i \cdot C_i, \text{ (wherein } C_0 = C_{IN})$$

$$S_i = X_i \oplus C_i$$

$$P = X_M X_{M-1} X_{M-2} \ldots X_1 X_0$$

$$G = Y_M + X_M Y_{M-1} + X_M X_{M-1} Y_{M-2} + \ldots + X_M X_{M-1} Y_{M-2} \ldots X_3 X_2 Y_1 + X_M X_{M-1} Y_{M-2} \ldots X_2 X_1 Y_0$$

Wherein "i" is equal to 0, 1, 2, . . . , M, and "$\oplus$" is the sign of Exclusive OR.

FIG. 2 illustrates an example of the adder circuit shown in FIG. 1. The adder circuit shown in FIG. 2 is designed for processing of six bit length binary data and is composed of current mode logic arrays. The second circuit means 12 which constitutes the carry producing stage of the adder circuit comprises a plurality of AND-OR gate circuits. In more detail, the AND-OR gate circuit of $i^{th}$ stage of the second circuit means 12 comprises AND gates in number (i+1) receiving the outputs of the first circuit means 11 as shown in FIG. 2 and the external carry signal $C_{IN}$ and an OR gate receiving the the outputs of the associated (i+1) AND gates and outputting a logical sum thereof as the internal carry signal $C_i$. Further, the third circuit means 13, which constitutes the output stage of the adder circuit, comprises Exclusive-OR gates each receiving the corresponding output signal $X_i$ of the first circuit means 11 and the corresponding internal carry signals $C_i$ from the second circuit means 12 and outputting the sum signal $S_i$ for each digit position of the inputted binary signal A or B.

FIG. 3 illustrates the detail of the elementary circuit of the first circuit means 11. As shown in FIG. 3, the elementary circuit of the first circuit means 11 is composed of a cascade-connected two-stage differential type switching circuit having two inputs receiving the bit signals $A_i$ and $B_i$ and having two output transistors outputting $X_i$ and $Y_i$ of the above logical formula, respectively.

FIG. 4 illustrates an elementary circuit of the second circuit means 12. More specifically, FIG. 4(*a*) illustrates a logical circuit of the second stage of the second circuit means 12, while FIG. 4(*b*) illustrates an equivalent transistor circuit thereof. The elementary circuit of this stage comprises three AND gates and an OR gate receiving the outputs of the AND gates. As shown in FIG. 4(*b*), the AND gate circuit is realized by the so-called emitter-coupled logic gate and the OR gate is constituted of a resistor-transistor logic having a transistor whose base is connected commonly to the collectors of the output transistors of all the AND gates.

Further, FIG. 5(*a*) illustrates the logical circuit of the $i^{th}$ stage of the third circuit means 13, while FIG. 5(*b*) illustrates the equivalent transistor circuit thereof. As shown in FIG. 5(*b*), the elementary circuit is composed of a cascade-connected two-stage differential type switching circuit constituting an emitter coupled transistor logic.

In the adder circuit of the bit slice type as shown in FIGS. 1 and 2, it is advantageous to process the input data having a larger bit length in order to shorten the propagation time of the carry signals. However, there is a restriction on the driving power of the signals in the circuits of each group and on the elementary circuits etc., and, thus, the number (M+1) of the inputted bit signals, that is, the bit length of the binary signals, is restricted. For example, in the adder circuit shown in FIG. 2, the signals $X_2$ and $X_3$ are applied to thirteen gates and the fan-in number of the gate 14 is six. Accordingly the propagation time is prolonged due to the fact that the adder circuit contains a large number of loads and the fan-in number of the gates composed therein is large. Thus, the desired effect, i.e. shortening the propagation time of the signal by concatenating a number of adder circuits in parallel in a same group of circuits, is decreased.

SUMMARY OF THE INVENTION

It is an object of the present invention to provide an adder circuit having a high execution speed.

It is another object of the present invention to provide an adder circuit of bit slice type which processes a large number of input bit signals without increasing the number of the loads to which the signals are applied and the fan-in number of the gates therein.

It is a further object of the present invention to provide an adder circuit in which the circuit means of the input stage comprises a plurality of arithmetic logic circuits, each receiving two pairs of input bit signals which correspond to two adjacent bits of the addend and the augend, whereby the propagation time of the signals therein is much shortened.

It is a still further object of the present invention to remove the problems of the prior art mentioned above.

According to the present invention, there is provided an adder circuit comprising:

first circuit means for receiving first and second binary input signals A and B each corresponding to a certain bit length (M+1) of binary data and producing parallel output signals;

second circuit means receiving the output signals from said first circuit means and an external carry signal from an external source and producing carry signals;

third circuit means coupled to said first and second circuit means for producing the result of the addition of said first and second binary input signals taking account of said external carry signal for each bit position thereof; and, said adder circuit being characterized in that the first circuit means comprises a plurality of arithmetic and logical circuits each receiving two pairs of the input bit signals ($A_{2n+1}$, $A_{2n}$, $B_{2n+1}$, $B_{2n}$) which correspond to the contents of the two adjacent bits of said input binary signals and producing output signals X, Y, G and P of the following logical formula.

$$G_{2n+1}=A_{2n+1}B_{2n+1}+(A_{2n+1}\oplus B_{2n+1})\cdot A_{2n}B_{2n}$$

$$P_{2n+1}=(A_{2n+1}\oplus B_{2n+1})\cdot(A_{2n}\oplus B_{2n})$$

$$X_{2n+1}=A_{2n+1}\oplus B_{2n+1}$$

$$X_{2n}=A_{2n}\oplus B_{2n}$$

$$Y_{2n}=A_{2n}\cdot B_{2n}$$

Wherein 2n=0, 2, 4, . . . , (M−1), 2n+1=1, 3, . . . , M and "⊕" is the sign of Exclusive OR.

According to an embodiment of the present invention, the above logical formula may be expressed as follows:

$$G_{2n+1}=A_{2n+1}B_{2n+1}+(A_{2n+1}+B_{2n+1})\cdot A_{2n}B_{2n}$$

$$P_{2n+1}=(A_{2n+1}+B_{2n+1})\cdot(A_{2n}+B_{2n})$$

$$X_{2n+1}=A_{2n+1}\oplus B_{2n+1}$$

$$X_{2n}=A_{2n}\oplus B_{2n}$$

$$Y_{2n}=A_{2n}\cdot B_{2n}$$

The second circuit means, that is, the carry producing stage of the adder circuit according to the present invention produce a carry signal $C_{2n}$ or $C_{2n+1}$ for each bit position of said first and second binary signals, said signals $C_{2n}$ and $C_{2n+1}$ being expressed as follows.

$$\begin{aligned}C_{2n} = {} & G_{2n-1} + P_{2n-1}G_{2n-3} + \\ & P_{2n-1}P_{2n-3}G_{2n-5} + \ldots + \\ & P_{2n-1}P_{2n-3}\ldots P_3G_1 + \\ & P_{2n-1}P_{2n-3}\ldots P_3P_1C_{IN}\end{aligned}$$

$$\begin{aligned}C_{2n+1} = {} & Y_{2n} + X_{2n}G_{2n-1} + \\ & X_{2n}P_{2n-1}G_{2n-3} + \ldots + \\ & X_{2n}P_{2n-1}P_{2n-3}\ldots P_3G_1 + \\ & X_{2n}P_{2n-1}P_{2n-3}\ldots P_3P_1C_{IN}\end{aligned}$$

wherein $C_0=C_{IN}=G_{-1}$ and $C_1=Y_0+X_0C_{IN}$.

On the other hand, the third circuit means, that is, the output stage of the adder circuit according to the present invention, produces the sum signal $S_i$ for the addition of said first and second binary signals for the $i^{th}$ bit position thereof, said sum signal $S_i$ being expressed as follows.

$$S_i=X_i\oplus C_i$$

Further, the second circuit means of the adder circuit of the present invention produces a carry generate signal G and a carry propagate signal P of the following logical formula.

$$G=G_{2n+1}+P_{2n+1}G_{2n-1}+P_{2n+1}P_{2n-1}G_{2n-3}+\ldots+P_{2n+1}P_{2n-1}P_{2n-3}\ldots P_5P_3G_1$$

$$P=P_{2n+1}P_{2n-1}P_{2n-3}\ldots P_3P_1$$

According to a still further embodiment of the present invention, adder circuits of the above type are concatenated so that each adder circuit may process the adjacent bit portion of the addend and augend and a carry lookahead circuit is coupled thereto. In this embodiment, the carry lookahead circuit receives the carry generate signal $G_{j-1}$ and the carry propagate signal $P_{j-1}$ from each of said adder circuits and outputs a carry signal $C_j$ to the j-th adder circuit. The carry signal $C_j$ may be expressed as follows:

$$C_j=G_{j-i}+P_{j-1}C_{j-1}$$

Wherein $C_0=C_{IN}$

On the other hand, the carry lookahead circuit produces a carry generate signal $G_{total}$ and a carry propagate signal $P_{total}$ for all of the inputted binary signals to said adder as follows.

$$G_{total}=G_j+P_jG_{j-1}+\ldots+P_jP_{j-1}\ldots P_2P_1G_0$$

$$P_{total}=P_jP_{j-1}P_{j-2}\ldots P_1P_0$$

These carry generate signal $G_{total}$ and carry propagate signal $P_{total}$ may be outputted to a next stage of addition.

These and other features, advantages and objects of the present invention will be understood more clearly by reference to the description of the preferred embodiments which will be made in connection with the accompanying drawings.

BRIEF DESCRIPTION OF THE ACCOMPANYING DRAWINGS

FIG. 5(*a*) illustrate a logical circuit of an elementary circuit of the output stage of the adder circuit shown in FIG. 2 and FIG. 5(*b*) illustrates the equivalent transistor circuit thereof;

PREFERRED EMBODIMENTS OF THE INVENTION

Figure 6:
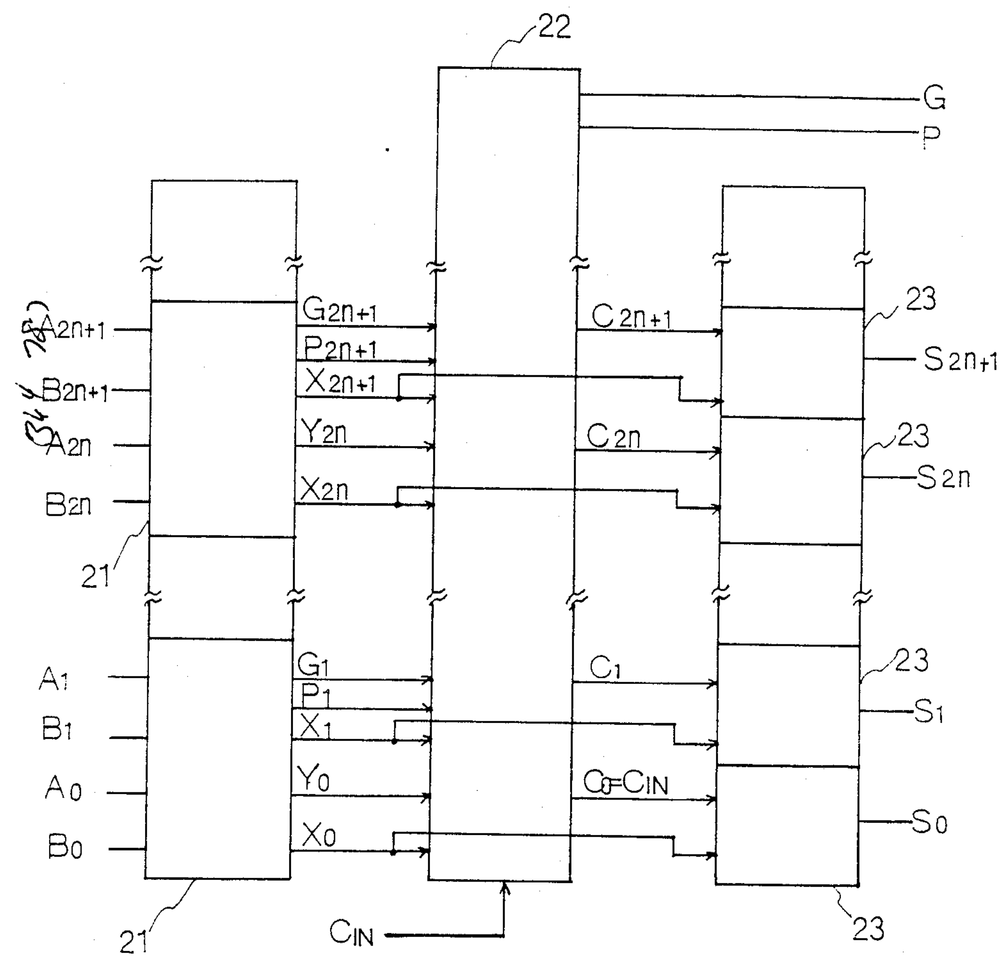
FIG. 6 is a block diagram of an adder circuit of an embodiment according to the present invention.

Now referring to FIG. 6, one example of the adder circuit according to the present invention will be explained. As shown in FIG. 6, the adder circuit of the present invention includes a first circuit comprising logic circuits of the input stage 21 for receiving first and second binary input signals A and B and producing parallel output signal, a second circuit comprising logical circuits of the carry signal producing stage 22 and a third circuit comprising logical circuits of the output stage 23 which are coupled to the first and second circuits for producing the result of the addition of the first and second binary input signals for each bit position thereof.

According to the present invention, the input stage 21 includes one logical circuit for each two pairs of the input bit signals $A_{2n+1}$, $A_{2n}$, $B_{2n+1}$, $B_{2n}$ which correspond to the contents of the two adjacent bits of the input binary signals A and B. Each of the input binary signals A and B correspond to a certain bit length (M+1) of binary data. The input stage 21 of the adder circuit produces five sorts of signals and outputs signals $X_{2n}$, $X_{2n+1}$, $Y_{2n}$, $G_{2n+1}$ and $P_{2n+1}$ for each pairs of input bit signals $A_{2n+1}$, $A_{2n}$, $B_{2n+1}$, $B_{2n}$.

According to the present invention, these output signals of the input stage 21 of the adder circuit are expressed in logical manner as follows;

$$B_{2n+1}=A_{2n+1}B_{2n+1}+(A_{2n+1}\oplus B_{2n+1})\cdot A_{2n}B_{2n}$$

$$P_{2n+1}=(A_{2n+1}\oplus B_{2n+1})\cdot(A_{2n}\oplus B_{2n})$$

$$X_{2n+1}=A_{2n+1}\oplus B_{2n+1}$$

$$X_{2n}=A_{2n}\oplus B_{2n}$$

$$Y_{2n}=A_{2n}\cdot B_{2n}$$

Wherein 2n=0, 2, 4, . . . , (M−1) and 2n+1=1, 3, . . . , M

The second circuit, that is, the carry signal producing stage 22 of the adder circuit receives the output signals $X_{2n}$, $X_{2n+1}$, $Y_{2n}$, $G_{2n+1}$ and $P_{2n+1}$ from the input stage 21 and an external carry signal $C_{IN}$ from an external source and produces internal carry signals $C_{2n}$ or $C_{2n+1}$ for each bit position and a carry generate signal G and a carry propagate signal P for the total input bit signals A and B. In this example, the carry signals $C_{2n}$ and $C_{2n+1}$ are expressed by the following logical formula:

$$\begin{aligned} C_{2n} &= G_{2n-1} + P_{2n-1}G_{2n-3} + \\ &\quad P_{2n-1}P_{2n-3}G_{2n-5} + \ldots + \\ &\quad P_{2n-1}P_{2n-3}\ldots P_3G_1 + \\ &\quad P_{2n-1}P_{2n-3}\ldots P_3P_1C_{IN} \\ C_{2n+1} &= Y_{2n} + X_{2n}G_{2n-1} + \\ &\quad X_{2n}P_{2n-1}G_{2n-3} + \ldots + \\ &\quad X_{2n}P_{2n-1}P_{2n-3}\ldots P_3G_1 + \\ &\quad X_{2n}P_{2n-1}P_{2n-3}\ldots P_3P_1C_{IN} \end{aligned}$$

wherein $C_0=C_{IN}=G_{-1}$ and $C_1=Y_0+X_0C_{IN}$.

Further the carry generate signal G and the carry propagate signal P are expressed in the following logical formula:

$$G=G_{2n+1}+P_{2n+1}G_{2n-1}+P_{2n+1}P_{2n-1}G_{2n-3}+\ldots+P_{2n+1}P_{2n-1}P_{2n-3}\ldots P_5P_3G_1$$

$$P=P_{2n+1}P_{2n-1}P_{2n-3}\ldots P_3P_1$$

The third circuit 23, that is, the output stage of the adder circuit, receives the output signal $X_i$ from the input stage 21 and the internal carry signal $C_i$ from the carry signal producing stage 22 and produce a sum signal $S_1$ for each bit position according to the following logical formula:

$$S_i = X_i \oplus C_i$$

Figure 7:
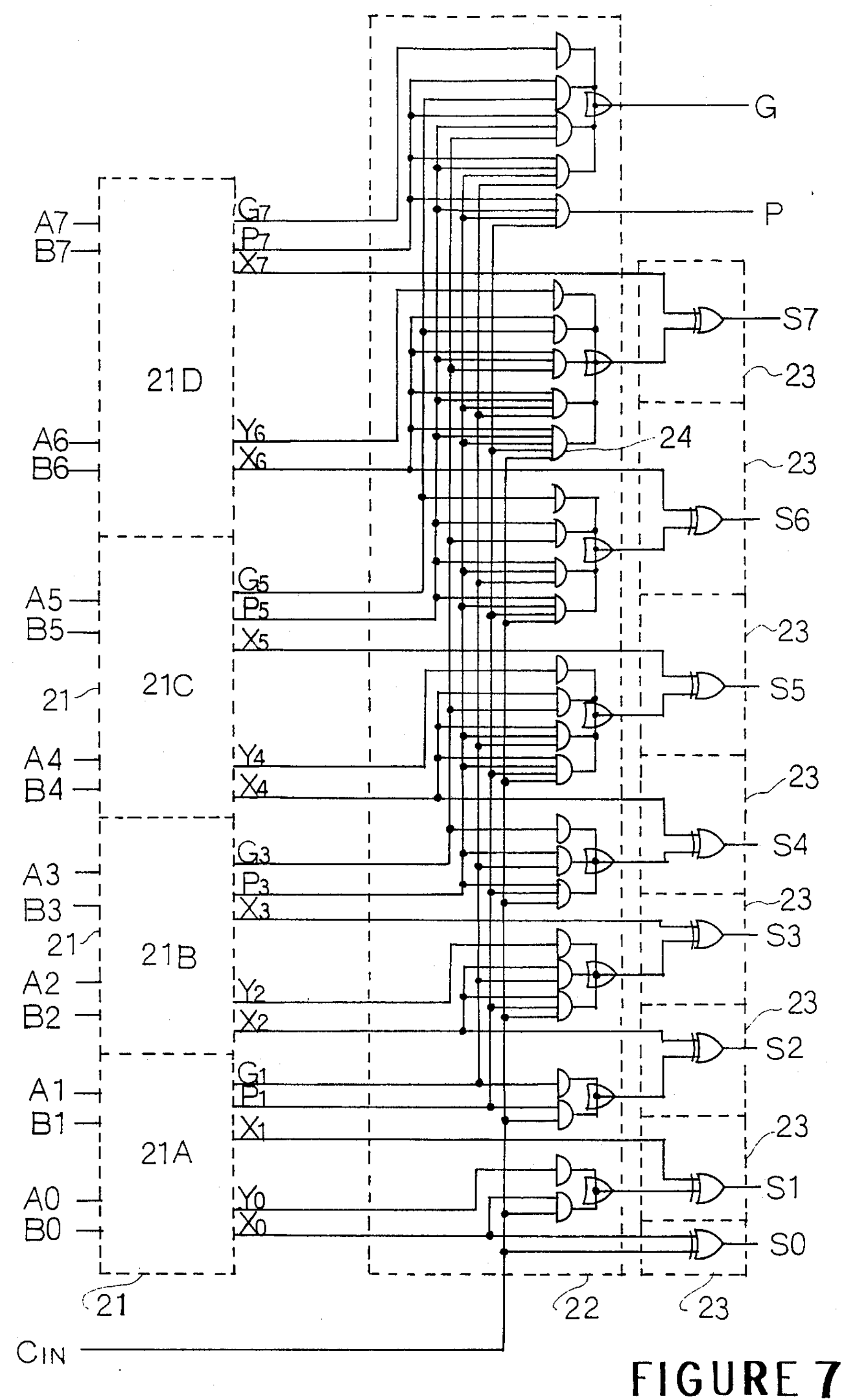
FIG. 7 illustrates an adder circuit of eight bit length of an embodiment of the present invention.

FIG. 7 illustrates an adder circuit of eight bit length of current mode switching circuit type. The adder circuit shown in FIG. 7 is designed for processing of eight bit length binary data and is composed of current mode arithmetic logic arrays. The first circuit, which constitute the input stage 21 of the adder circuit, is composed of four arithmetic and logical arrays 21A, 21B, 21C, 21D each receiving two pairs of input bit signals $A_{2n+1}$, $A_{2n}$, $B_{2n+1}$, $B_{2n}$. Each of these arithmetic and logic arrays constituting the input stage of the adder circuit may be composed of four sets of current mode switching circuits as shown in FIG. 8.

Figure 3:
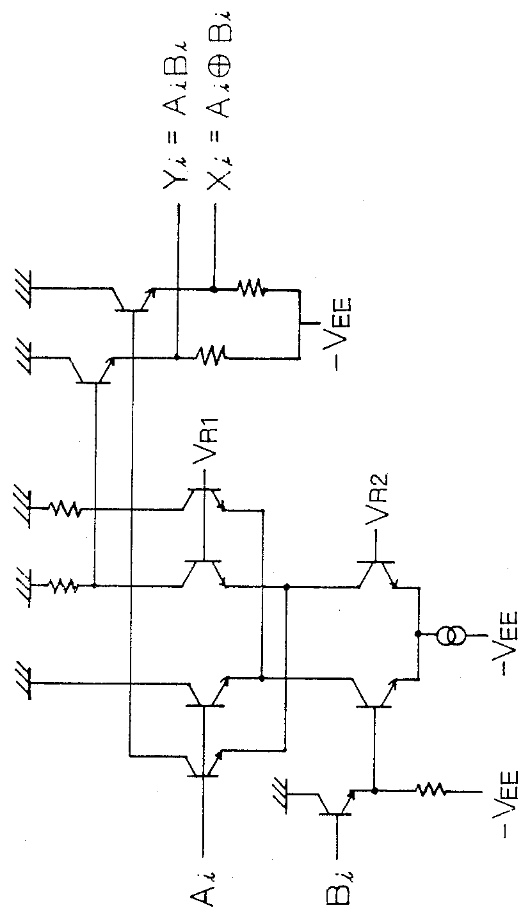
FIG. 3 illustrates an equivalent transistor circuit of the elementary circuit of the input stage of the adder circuit shown in FIG. 2.
Figure 8:
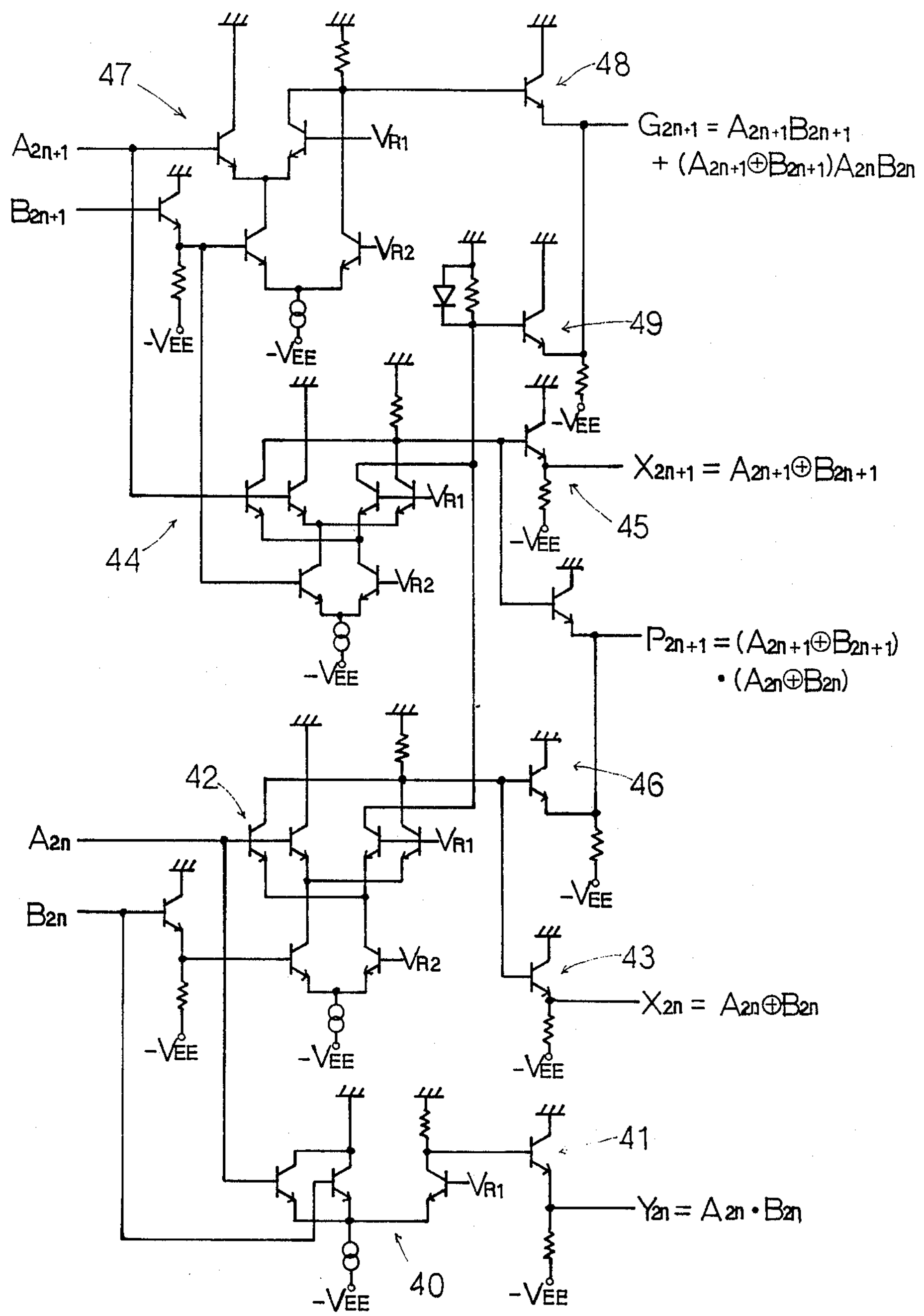
FIG. 8 is a transistor circuit of the elementary circuit of the input stage of the adder circuit shown in FIG. 7.

As shown in FIG. 8, each of the arithmetic and logic arrays 21A to 21D includes a current mode switching type transistor logic circuit which has four inputs for receiving the input bit signals $A_{2n+1}$, $A_{2n}$, $B_{2n+1}$, $B_{2n}$ and five outputs for outputting the signals $X_{2n}$, $X_{2n+1}$, $Y_{2n}$, $G_{2n+1}$ and $P_{2n+1}$. The inputs $A_{2n}$ and $B_{2n}$ are applied to a first emitter-coupled transistor logic circuit 40 adapted to provide through a resistor-transistor logic circuit 41 a logical product $A_{2n} \cdot B_{2n}$. These inputs $A_{2n}$ and $B_{2n}$ are also applied to a second emitter-coupled transistor logic circuit of cascaded double-stage construction. This circuit is adapted to output through a resistor-transistor logic circuit 43 an exclusive logical sum $A_{2n} \oplus B_{2n}$. On the other hand, the inputs $A_{2n+1}$ and $B_{2n+1}$ are applied to a third emitter-coupled transistor logic circuit 44 of cascaded double-stage construction that is adapted to supply through a resistor-transistor logic circuit 45 an exclusive logical sum $A_{2n+1} \cdot B_{2n+1}$. The outputs of this third logic circuit 44 and the second logic circuit 42 are coupled to a resistor-transistor logic circuit 46 which constitutes an AND gate for outputting a logical result $(A_{2n+1} \oplus B_{2n+1}) \cdot (A_{2n} \oplus B_{2n})$. Further, the inputs $A_{2n+1}$ and $B_{2n+1}$ are also applied to a fourth emitter-coupled transistor logic circuit 47 of cascaded double-stage arrangement to produce a logical product $A_{2n+1} \cdot B_{2n+1}$, which is in turn connected to a resistor-transistor logic circuit 48 coupled with another resistor-transistor logic circuit 49 which receives the outputs of the second and third emitter-coupled logic circuits 42 and 44 so that the logical result $A_{2n+1} \cdot B_{B2n+1} + (A_{2n+1} \oplus B_{2n+1})\ A_{2n} \cdot B_{2n}$ can be obtained. The number of the transistor elements through which the signal passes in the transistor circuit shown in FIG. 8 is the same as that in the transistor circuit shown in FIG. 3 which processes only two input bit signals. By contrast, the transistor circuit shown in FIG. 8 processes four input bit signals.

Figure 4A:
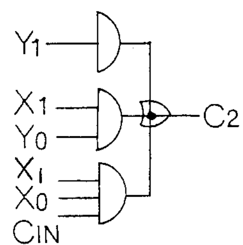
FIG. 4(*a*) illustrates a logical circuit of an elementary circuit of the carry producing stage of the adder circuit shown in FIG. 2 and FIG. 4(*b*) illustrates an equivalent transistor circuit thereof.
Figure 4B:
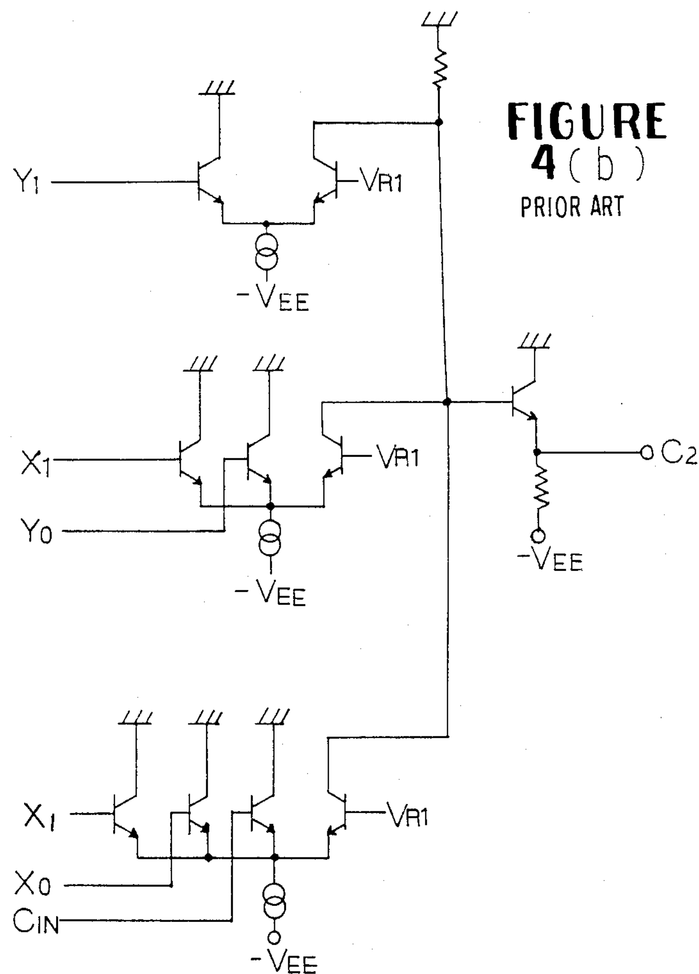

The second circuit which constitute the carry signal producing stage 22 of the adder circuit comprises a plurality of AND-OR gate circuits of the same collector-dot type as that shown in FIG. 4. Further the third circuit constituting the output stage 23 of the adder circuit has the same construction as the third circuit 13 of the adder circuit of the prior art shown in FIG. 2. That is, the third circuit 23 comprise Exclusive OR gates each receiving the output signal $X_i$ from the first circuit 21 and the internal carry signals $C_i$ from the second circuit means 22 and outputting the sum signal $S_i$ for each bit of the inputted binary signal A or B.

Now the execution time of the adder is determined by the propagation delay of signals in each adder circuit. The propagation delay is caused by the transistor switching and thus it is dependent upon the number of loads through which the signals pass from the input to the output of the adder and upon the fan-in number of the gates mounted in the transistor circuit.

Figure 1:
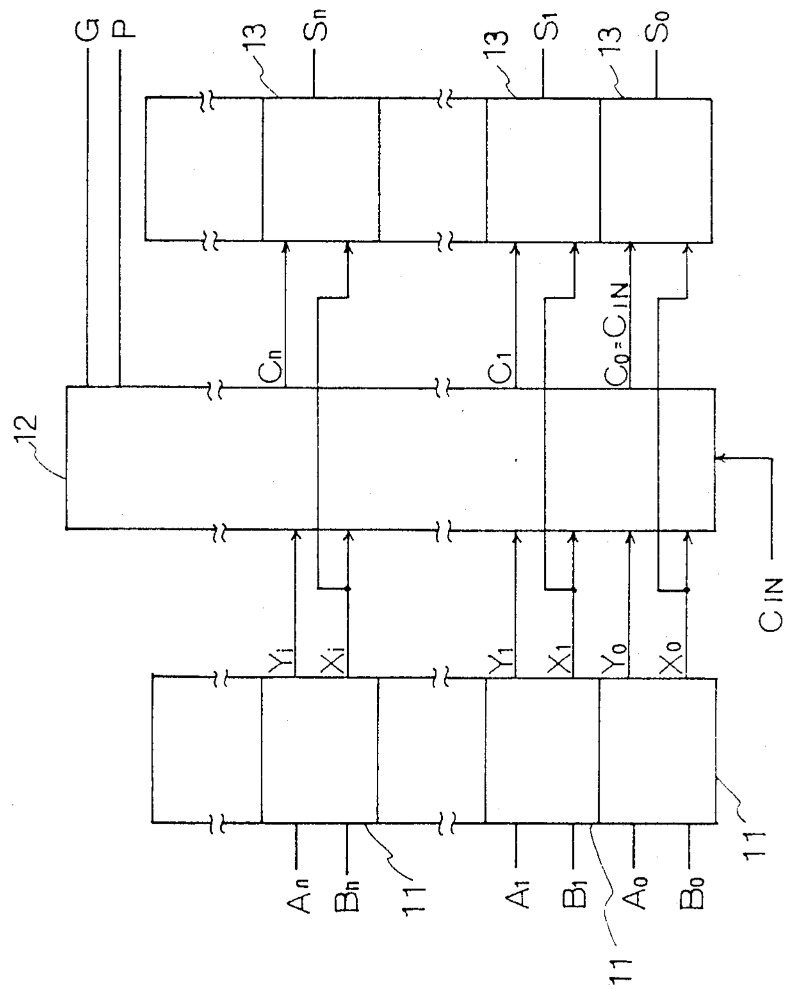
FIG. 1 is a block diagram of an adder circuit of the prior art.
Figure 2:
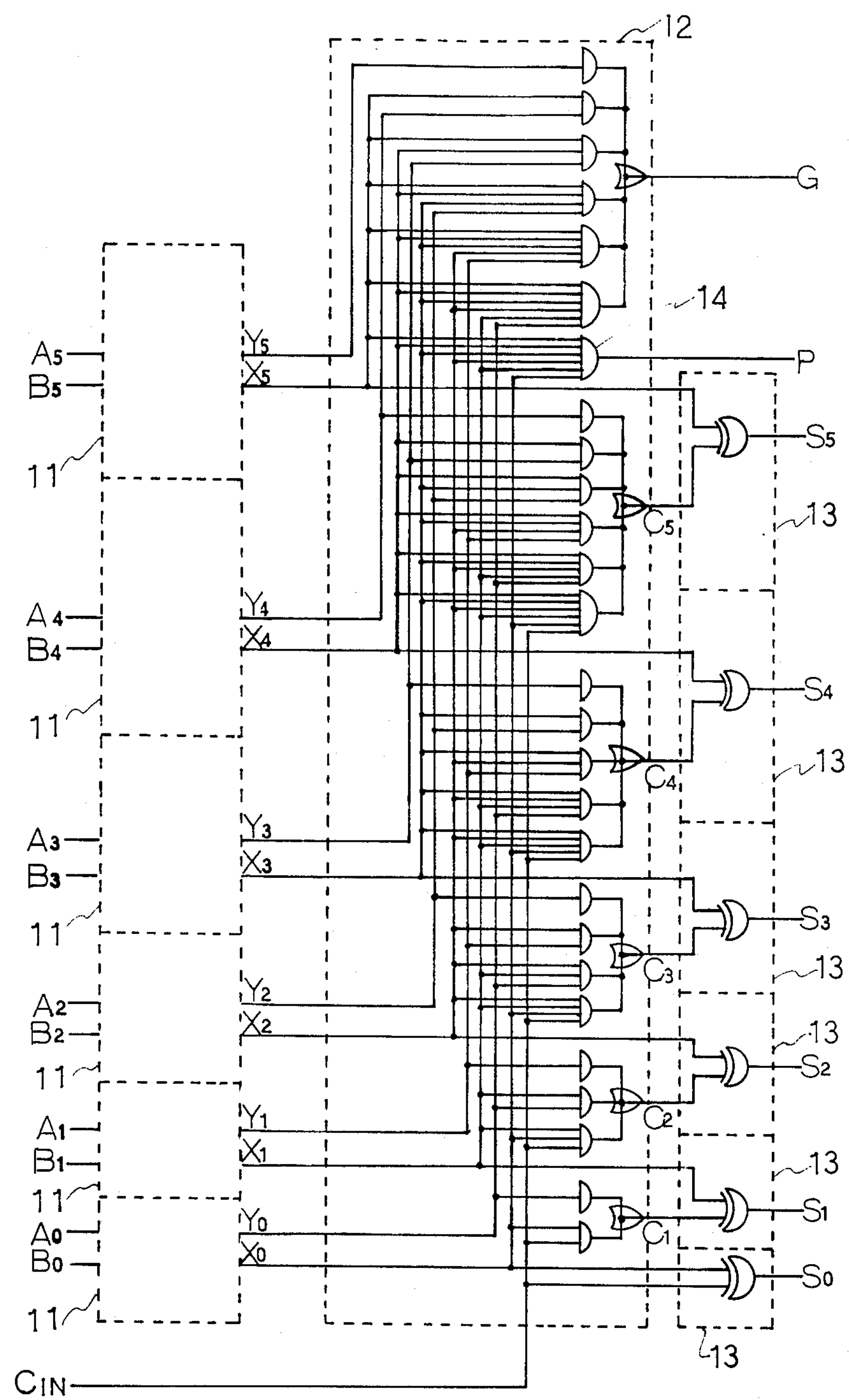
FIG. 2 illustrates a logical circuit of a prior art adder circuit of six bit length composed of current mode switching means.

Now comparing the adder circuits shown in FIGS. 2 and 7, in the adder circuit shown in FIG. 2, the signal which is applied to a maximum number of loads is the signal $X_2$ or $X_3$, which are applied to thirteen AND gates. Further the gate which has the maximum fan-in number is the gate 14, of which the fan-in number is six. To the contrary, in the adder circuit shown in FIG. 7, the signal which is applied to a maximum number of loads is the signal $P_3$, which is applied to ten AND gates. The gate which has the maximum fan-in number in the adder circuit shown in FIG. 7 is the gate 24, which has five inputs. Thus, the maximum number of loads and the maximum fan-in number in the adder circuit shown in FIG. 7 are smaller than those of the circuit shown in FIG. 2. This means that the propagation delay of the adder circuit shown in FIG. 7 is shorter than that of the adder circuit shown in FIG. 2, although the adder circuit shown in FIG. 7 can process the binary inputs having a larger bit length than that shown in FIG. 2. In other words, the adder circuit shown in FIG. 7 has a higher execution speed than that shown in FIG. 2.

If the same maximum number of loads as that of FIG. 2 and the same maximum fan-in number are allowed, it is possible to design an adder circuit capable of processing a larger number of input bit signals. Further if an adder circuit can process a larger number of input bit signals, the propagation delay time of the signals between the adder circuits can be shortened and the number of the stages of the carry lookahead circuit coupled to the adder circuits can be decreased. Thus the total execution time of the adder can be much shortened.

Figure 9:
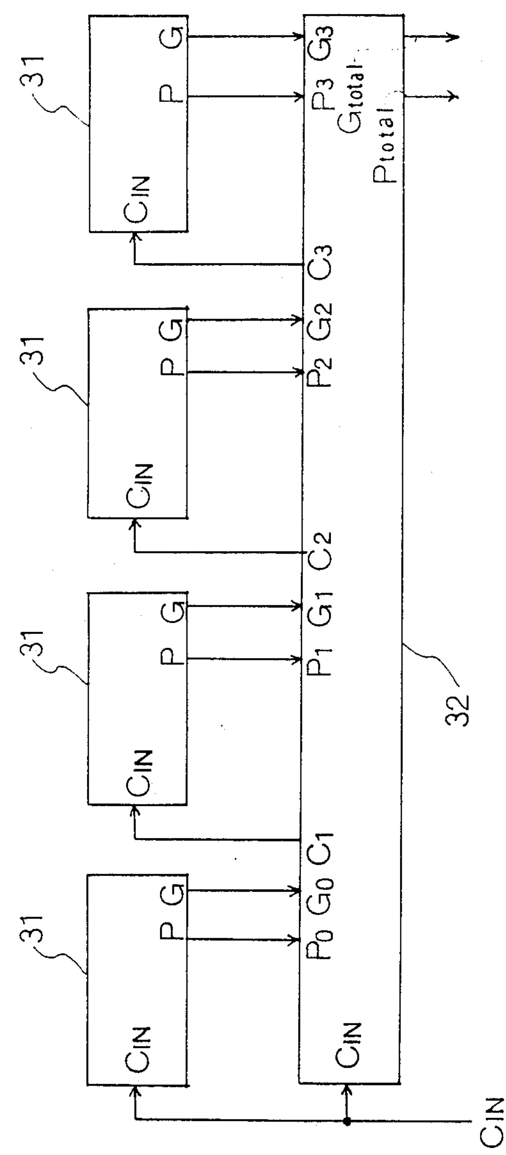
FIG. 9 shows a block diagram of a multibit parallel adders which are coupled to a carry lookahead circuit.

Now referring to FIG. 9 which is a block diagram of an adder according to another embodiment of the present invention, adder circuits 31 of the above explained type are concatenated so that each adder circuit 31 may process the adjacent bit portion of the addend and augend. The adder further includes a carry lookahead circuit 32 coupled to the adder circuit 31. The carry lookahead circuit 32 receives the carry generate signal $G_j$ and the carry propagate signal $P_j$ from the adder circuits and outputs an internal carry signal $C_{j+1}$ to the (j+1)-th adder circuit 31. The carry signal $C_j$ may be expressed as follows:

$$C_j = G_{j-1} + P_{j-1} C_{j-1}$$

Wherein $C_0 = C_{IN}$ $j = 0, 1, 2, \ldots$

On the other hand, the carry lookahead circuit 32 produces a carry generate signal $G_{total}$ and a carry propagate signal $P_{total}$ for all of the binary signals inputted to said adder as follows.

$$G_{total} = G_j + P_j G_{j-1} + \ldots + P_j P_{j-1} \ldots P_2 P_1 G_0$$

$$P_{total} = P_j P_{J-1} P_{j-2} \ldots P_1 P_0$$

These carry generate signal $G_{total}$ and carry propagate signal $P_{total}$ may be outputted to another carry lookahead circuit of the next stage.

Figure 10:
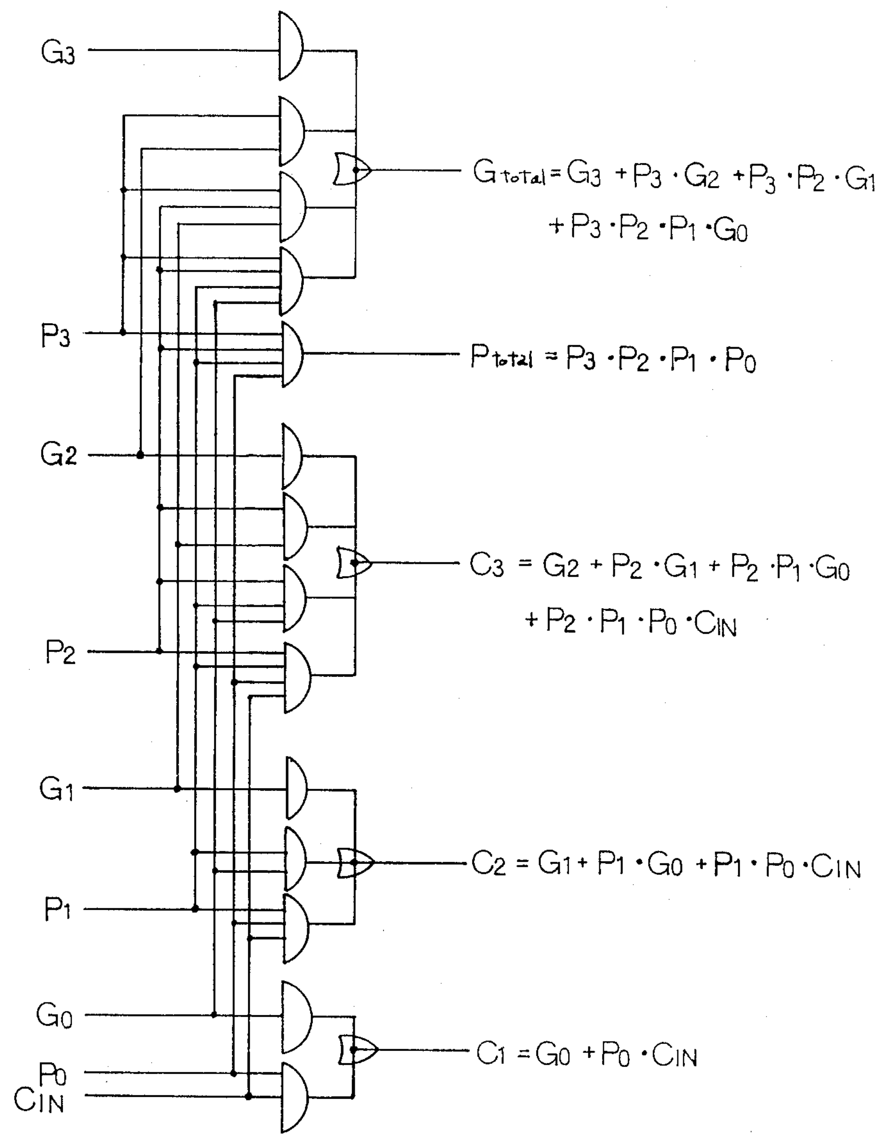
FIG. 10 illustrates a logical block diagram of the carry lookahead circuit shown in FIG. 9.

FIG. 10 illustrates a logical circuit of the carry look ahead circuit 32. As shown in FIG. 10, the carry lookahead circuit 32 is composed of AND-OR gate circuits and processes in parallel the carry generate signals and the carry propagate signals from all of the adder circuit 31.

A plurality of the adders as shown in FIG. 9 may be further concatenated to constitute an adder capable of executing the addition of the binary data of larger bit length.

Now return to the examination on the propagation speed of the adder circuits. If the adder circuit shown in FIG. 7 is employed as the adder circuit 31 in FIG. 9, it is possible to construct an adder circuit of 32 bit length, while, with the adder circuit shown in FIG. 2, an adder circuit of only 24 bit length is obtained. Thus, with the adder circuits of the prior art, it is necessary to incorporate a plurality of carry lookahead circuits in order to obtain an adder circuit having a bit length larger than 25 bits, which means a further delay in the propagation of signals. To the contrary, with the adder circuit of the present invention, the propagation speed of the signals in the adder circuit itself becomes shortened and the number of the necessary carry lookahead circuits may be also decreased to thereby shorten the total execution speed of the resulting adder.

Figure 11:
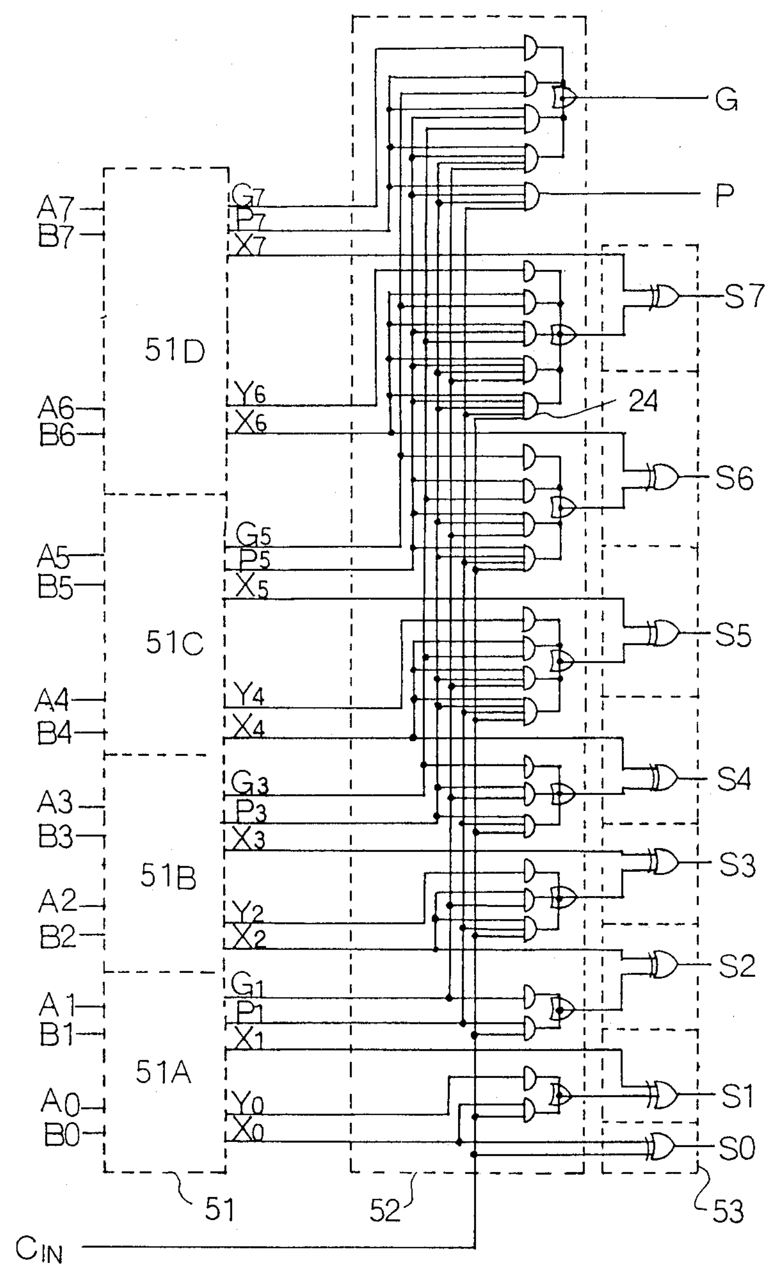
FIG. 11 is a block diagram of an adder circuit according to another embodiment of the present invention.

FIG. 11 illustrates an adder circuit of eight bit length according to a still further embodiment of the present invention.

The adder circuit shown in FIG. 11 has the same function as that shown in FIG. 7, but it is different in the following points:

First, the adder circuit comprises the input stage 51 including four logical circuits 51A, 51B, 51C, 51D each of which is adapted to receive each two pairs of the input bit signals $A_{2n+1}$, $A_{2n}$, $B_{2n+1}$, $B_{2n}$ and to produce signals $X_{2n}$, $X_{2n+1}$, $Y_{2n}$, $G_{2n+1}$ and $P_{2n+1}$ for each pairs of input bit signals $A_{2n+1}$, $A_{2n}$, $B_{2n+1}$, $B_{2n}$ in logical manner as follows;

$$G_{2n+1}=A_{2n+1}B_{2n+1}+(A_{2n+1}+B_{2n+1})\cdot A_{2n}B_{2n}$$

$$P_{2n+1}=(A_{2n+1}+B_{2n+1})\cdot(A_{2n}+B_{2n})$$

$$X_{2n+1}=A_{2n+1}\oplus B_{2n+1}$$

$$X_{2n}=A_{2n}\oplus B_{2n}$$

$$Y_{2n}=A_{2n}\cdot B_{2n}$$

Wherein 2n=0, 2, 4, . . . , (M−1) and 2n+1=1, 3, . . . , M

Figure 12:
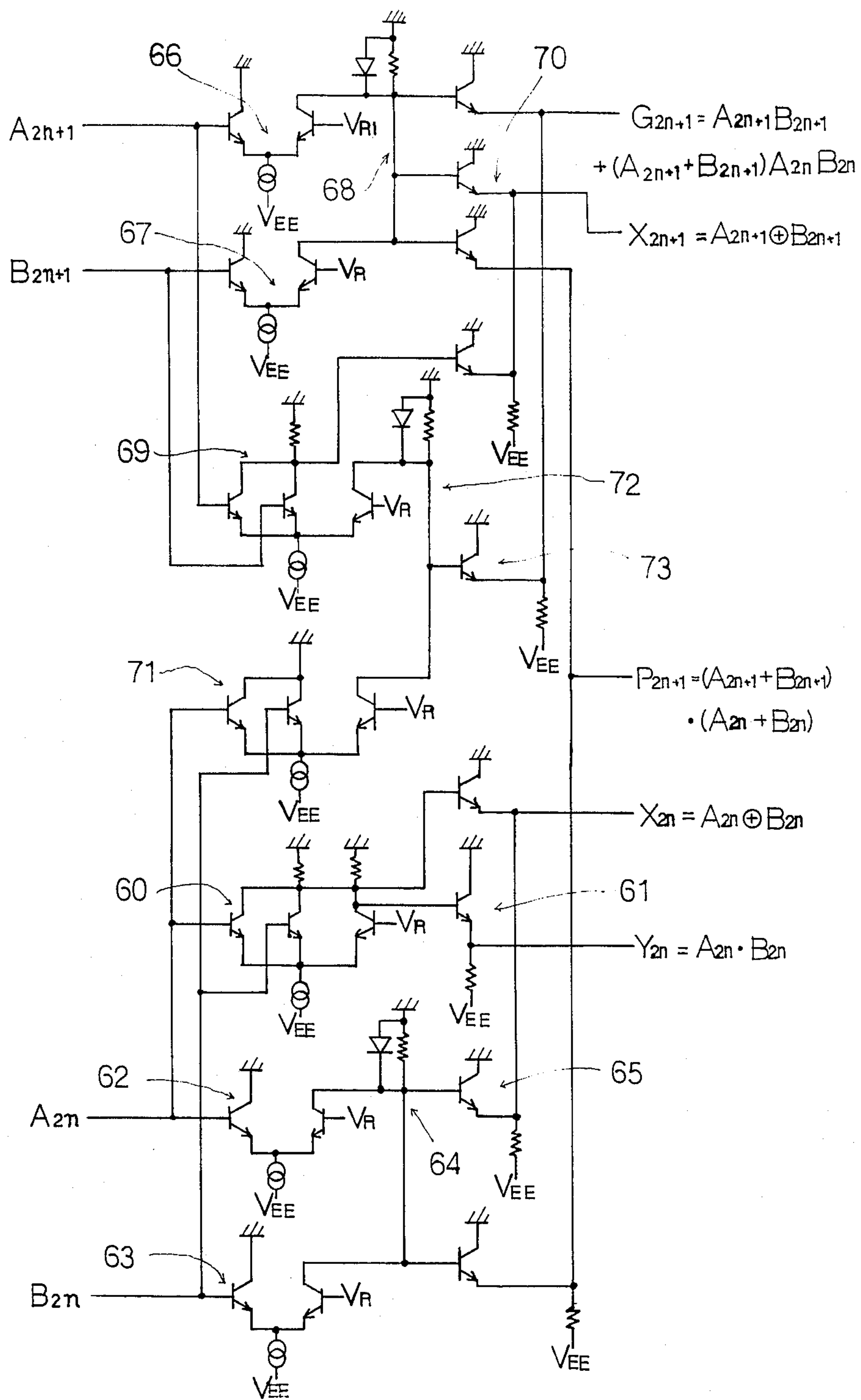
FIG. 12 illustrates an equivalent transistor circuit of elementary circuit of the input stage of the adder circuit shown in FIG. 11.

Next, each logical circuit in the first circuit 51 of the adder circuit shown in FIG. 11 are composed by seven one-stage current mode switching circuits, as shown in FIG. 12. Namely, the inputs $A_{2n}$ and $B_{2n}$ are applied to a first emitter-coupled transistor logic circuit 60 adapted to provide through a resistor-transistor logic circuit 61 a logical product $A_{2n}\cdot B_{2n}$. These inputs are also applied to two emitter-coupled switching circuits 62 and 63, respectively, which are connected at their outputs to a resistor-diode logic circuit 64 that acts as an OR gate. The output of the OR gate 64 and an inverted output of the logic circuit 60 are connected to a resistor-transistor logic circuit 65 that acts as an AND gate.

Further, the inputs $A_{2n+1}$ and $B_{2n}$ are applied to two emitter-coupled switching circuits 66 and 67, respectively, which are in turn connected at their outputs to a resistor-diode logic 68 constituting an OR gate. In addition, the inputs $A_{2n+1}$ and $B_{2n+1}$ are connected to an emitter-coupled transistor logic 69 whose inverted output is applied together with the output of the OR gate 68 to a resistor-transistor logic circuit 70, acting as an AND gate which provides $A_{2n+1}\oplus B_{2n+1}$.

Futhermore, the inputs $A_{2n}$ and $B_{2n}$ are applied to an emitter-coupled transistor logic circuit 71 whose non-inverted output is connected together with a non-invented output of the logic circuit 69 to a resistor-diode logic circuit 72. The outputs of the logic circuit 72 and 68 are connected to a resistor-transistor logic circuit 73 acting as an OR gate, which provides an logical result $A_{2n+1}\cdot B_{2n+}+(A_{2n+1}+B_{2n+1})A_{2n}\cdot B_{2n}$.

As seen from the above, since the logic circuit shown in FIG. 12 has no cascade double-stage transistor-transistor logic, the operation is very stable and very quick. In this circuit, the number of the element through which the signals passes is the same as that in the circuit of the prior art shown in FIG. 3.

Figure 13A:
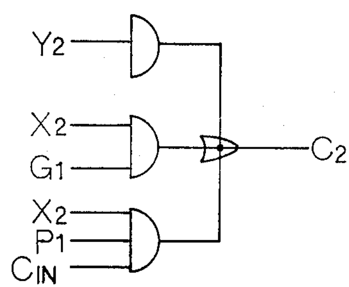
FIG. 13(*a*) illustrates a logical circuit of an elementary circuit of the carry producing stage of the adder circuit shown in FIG. 11 and FIG. 13(*b*) illustrates an equivalent transistor circuit thereof.
Figure 13B:
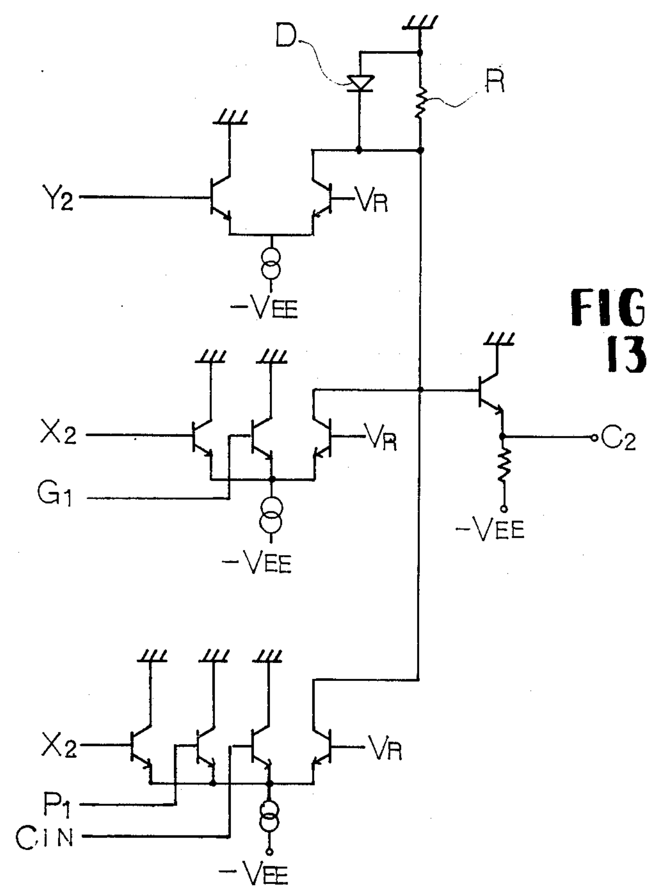

The outputs of the input stage 51 are connected to the carry signal producing stage 52 of the adder circuit composed by AND-OR gates, similarly to the first embodiment shown in FIG. 7. But, the AND-OR gates of the stage 52 are constructed as shown in FIG. 13. Namely, a diode D is connected in parallel with the collector resistor, differently from the circuit of FIG. 4 which can be used in the first embodiment, and in order to prevent the saturation of the collector common-connected transistors when each of the transistors are put conductive. This construction is employed due to the fact that the signals $G_{2n+1}$ and $P_{2n+1}$ can be concurrently logical "1".

Figure 14:
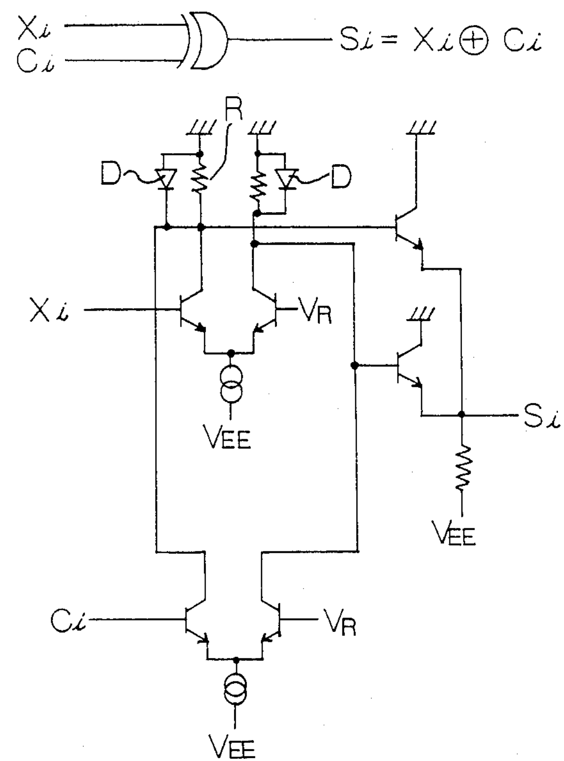
FIG. 14(*a*) illustrates a logical circuit of an elementary circuit of the output stage of the adder circuit shown in FIG. 11 and FIG. 14(*b*) illustrates a transistor circuit thereof.

The outputs of the stage 52 are connected to an output stage 53, which is constituted of Exclusive OR gate array, similarly to the first embodiment shown in FIG. 7. But, as shown in FIG. 14, an elementary circuit of the Exclusive OR gate is of non-cascaded single-stage emitter-coupled logic which includes diodes D connected in parallel to the collector resistors R. This is a main point different from the circuit of FIG. 5.

Now comparing the adder circuits shown in FIGS. 2 and 11, in the adder circuit shown in FIG. 11, the signal which is applied to a maximum number of loads is the signal $P_3$, which is applied to ten AND gates. Further the gate which has the maximum fan-in number is the gate 24, of which the fan-in number is five. These maximum number of the loads and the maximum fan-in number in the adder circuit shown in FIG. 11 are smaller than those of the circuit shown in FIG. 2. This means that the propagation delay of the adder circuit shown in FIG. 11 is shorter than that of the adder circuit shown in FIG. 2, although the adder circuit shown in FIG. 11 can process the binary inputs having a larger bit length than that shown in FIG. 2. In other words, the adder circuit shown in FIG. 11 has a higher execution speed than that shown in FIG. 2.

If the same maximum number of loads as that of FIG. 2 and the same maximum fan-in number are allowed, it is possible to design an adder circuit capable of processing a larger number of input bit signals. Further if an adder circuit can process a larger number of input bit signals, the propagation delay time of the signals between the adder circuits can be shortened and the number of the stage of the carry lookahead circuit coupled to the adder circuits can be decreased. Thus the total execution time of the adder can be much shortened.

I claim:

1. An adder circuit for connection to a source of input signals and a source of external carry signals comprising:

first circuit means connected to receive first and second binary input signals A and B from said source of input signals, each of said signals corresponding to a certain bit length (M+1) of binary data, for producing parallel output signals;

second circuit means connected to receive the output signals from said first circuit means and an external carry signal from the source of external carry signals for producing internal carry signals;

third circuit means coupled to receive the parallel output signals from said first circuit means and the internal carry signals from said second circuit means for producing the result of the addition of said first and second binary input signals taking account of said external carry signal for each bit position thereof; and said adder circuit being characterized in that (a) said first circuit means comprises a plurality of arithmetic and logical circuits each receiving two pairs of the input bit signals ($A_{2n+1}$, $A_{2n}$, $B_{2n+1}$, $B_{2n}$) which correspond to the contents of the two adjacent bits of said input binary signals and producing output signals $G_{2n+1}$, $P_{2n+1}$, $X_{2n+1}$, $X_{2n}$ and $Y_{2n}$ in accordance with the following logical formula:

$$G_{2n+1}=A_{2n+1}B_{2n+1}+(A_{2n+1}\oplus B_{2n+1})\cdot A_{2n}B_{2n}$$

$$P_{2n+1}=(A_{2n+1}\oplus B_{2n+1})\cdot(A_{2n}\oplus B_{2n})$$

$$X_{2n+1}=A_{2n+1}\oplus B_{2n+1}$$

$$X_{2n}=A_{2n}\oplus B_{2n}$$

$$Y_{2n}=A_{2n}\cdot B_{2n}$$

Wherein 2n=0, 2, 4, . . . , (M−1) and 2n+1, 3, . . . , M and (b) said third circuit means includes an Exclusive-OR circuit which receives one corresponding output $X_i$ from said first circuit means and the internal carry signal $C_i$ from a corresponding unit of said second circuit means so as to produce the sum signal $S_i$ for the addition of said first and second binary signals for the $i^{th}$ bit position thereof, said sum signal $S_i$ being expressed by the following logical formula:

$$S_i=X_i\oplus C_i.$$

2. An adder circuit as claimed in claim 1, wherein said second circuit means produce carry signal $C_{2n}$ or $C_{2n+1}$ for each bit position of said first and second binary signals, said signals $C_{2n}$ and $C_{2n+1}$ being expressed by the following logical formula:

$$C_{2n} = G_{2n-1} + P_{2n-1}G_{2n-3} + P_{2n-1}P_{2n-3}G_{2n-5} + \ldots + P_{2n-1}P_{2n-3}\ldots P_3G_1 + P_{2n-1}P_{2n-3}\ldots P_3P_1C_{1N}$$

$$C_{2n+1} = Y_{2n} + X_{2n}G_{2n-1} + X_{2n}P_{2n-1}G_{2n-3} + \ldots + X_{2n}P_{2n-1}P_{2n-3}\ldots P_3G_1 + X_{2n}P_{2n-1}P_{2n-3}\ldots P_3P_1C_{1N}$$

wherein $C_0=C_{1N}=G_{-1}$ and $C_1=Y_0+X_0C_{1N}$.

3. An adder circuit as claimed in claim 2, wherein the second circuit means produce a carry generate signal G and a carry propagate signal P of the following logical formula:

$$G=G_{2n+1}+P_{2n+1}G_{2n-1}+P_{2n+1}P_{2n-1}G_{2n-3}+\ldots+P_{2n+1}P_{2n-1}P_{2n-3}\ldots P_5P_3G_1$$

$$P=P_{2n+1}P_{2n-1}P_{2n-3}\ldots P_3P_1.$$

4. An adder circuit as claimed in claim 2, wherein each of said arithmetic and logical circuits includes AND gates and OR gates which are constituted of current mode transistor switching circuits and which assembled to receive input signals $A_{2n+1}$, $A_{2n}$, $B_{2n+1}$ and $B_{2n}$ so as to generate five outputs $G_{2n+1}$, $P_{2n+1}$, $X_{2n+1}$, $X_{2n}$ and $Y_{2n}$.

5. An adder circuit as claimed in claim 2, wherein said first circuit means includes a plurality of arithmetic and logic arrays, each of which includes a current mode switching type transistor logic circuit having four switching type transistor logic circuits having four inputs for receiving the input bit signals $A_{2n+1}$, $A_{2n}$, $B_{2n+1}$, $B_{2n}$ and five outputs for outputting the $X_{2n}$, $X_{2n+1}$, $Y_{2n}$, $G_{2n+1}$ and $P_{2n+1}$, the current mode switching type transistor logic circuit including:

a first emitter-coupled transistor logic receiving the inputs $A_{2n}$ and $B_{2n}$ to provide through a first emitter follower a logical product $A_{2n}.B_{2n}$;

a second emitter-coupled transistor logic of cascaded double-stage construction receiving the inputs $A_{2n}$ and $B_{2n}$ to output through a second emitter follower an exclusive logic sum $A_{2n}\oplus B_{2n}$;

a third emitter-coupled transistor logic of cascaded double-stage construction receiving the inputs $A_{2n+1}$ and $B_{2n+1}$ to supply through a third emitter follower an exclusive logical sum $A_{5n+1}\oplus B_{2n+1}$;

the outputs of this third logic and the second logic being an emitter dotting which constitutes an AND gate for outputting a logic result $(A_{2n+1}\oplus B_{2n+1})\cdot(A_{2n}\oplus B_{2n})$, a fourth emitter-coupled transistor logic of cascaded double-stage arrangement receiving the inputs $A_{2n+1}$ and $B_{2n+1}$ to produce a logical product $A_{2n+1}\cdot B_{2n+1}$, which is in turn connected to a fourth emitter follower coupled with a fifth emitter follower which receives the outputs of the second and third emitter-coupled logics so that the logical result $A_{2n+1}\cdot B_{2n+1}+(A_{2n+1}\oplus B_{2n+1})A_{2n}\cdot B_{2n}$, can be obtained, and wherein the second circuit means including a plurality of AND-OR gate circuits of the collector-dot type, each of which includes a plurality of AND gates receiving the corresponding output of the first circuit means and an OR gate receiving the outputs of the AND gates, each of the AND gate circuits being composed to an emitter-coupled logic gate and the OR gate being constituted of a collector dotting having a transistor whose base is connected commonly to the collectors of the output transistors of all the AND gates.

6. An adder circuit for connection to a source of input signals and a source of external carry signals comprising:

a plurality of adder circuits each for receiving from said source of input signals first and second binary signals of (M+1) bit length, each corresponding to a certain bit portion of the addend and augend and for producing the result of the addition of said first and second binary signals for each bit portion and a carry generate signal $G_i$ and a carry propagate signal $P_i$; and a carry look-ahead circuit coupled to said adder circuits;

each of said adder circuits comprising:

first circuit means connected to receive first and second binary input signals A and B from said source of input signals, each of said signals corresponding to a certain bit length (M+1) of binary data, for producing parallel output signals;

second circuit means connected to receive the output signals from said first circuit means and an external carry signal from the source of external carry signals for producing internal carry signals;

third circuit means coupled to receive the parallel output signals from said first circuit means and the internal carry signals from said second circuit means for producing the result of the addition of said first and second binary input signals taking account of said external carry signal for each bit position thereof; and said adder circuit being characterized in that (a) said first circuit means comprises a plurality of arithmetic and logical circuits each receiving two pairs of the input bit signals ($A_{2n+1}$, $A_{2n}$, $B_{2n+1}$, $B_{2n}$) which correspond to the contents of the two adjacent bits of said input binary signals and producing output signals in accordance with the following logical formula:

$$G_{2n+1}=A_{2n+1}B_{2n+1}+(A_{2n+1}\oplus B_{2n+1})\cdot A_{2n}B_{2n}$$

$$P_{2n+1}=(A_{2n+1}\oplus B_{2n+1})\cdot(A_{2n}\oplus B_{2n})$$

$$X_{2n+1}=A_{2n+1}\oplus B_{2n+1}$$

$$X_{2n}=A_{2n}\oplus B_{2n}$$

$$Y_{2n}=A_{2n}\cdot B_{2n}$$

Wherein 2n=0, 2, 4, . . . , (M−1) and 2n+1=1, 3, . . . , M; and (b) said second circuit means produce carry signal $C_{2n}$ or $C_{2n+1}$ for each bit position of said first and second binary signals, said signals $C_{2n}$ and $C_{2n+1}$ being expressed by the following logical formula:

$$C_{2n} + G_{2n-1} + P_{2n-1}G_{2n-3} + P_{2n-1}P_{2n-3}G_{2n-5} + \ldots + P_{2n-1}P_{2n-3} \ldots P_3G_1 + P_{2n-1}P_{2n-3} \ldots P_3P_1C_{1N}$$

-continued $$C_{2n} + 1 = Y_{2n} + X_{2n}G_{2n-1} + X_{2n}P_{2n-1}G_{2n-3} + \ldots + X_{2n}P_{2n-1}P_{2n-3} \ldots P_3G_1 + X_{2n}P_{2n-1}P_{2n-3} \ldots P_3P_1C_{1N}$$

wherein $C_0=C_{IN}=G_{-1}$ and $C_1=Y_0+X_0+X_0\cdot C_{IN}$; and (c) said third circuit means includes an Exclusive-OR circuit which receives one corresponding output $X_i$ from said first circuit means and the internal carry signal $C_i$ from a corresponding unit of said second circuit means so as to produce the sum signal $S_i$ for the addition of said first and second binary signals for the $i^{th}$ bit position thereof, said sum signal $S_i$ being expressed by the following logical formula:

$$S_i=X_i\oplus C_i.$$

7. An adder as claimed in claim 6, wherein said second circuit means produce a carry generate signal G and a carry propagate signal P of the following formula.

$$G=G_{2n+1}+P_{2n+1}G_{2n-1}+P_{2n+1}P_{2n-1}G_{2n-3}+ \ldots +P_{2n+1}P_{2n-1}P_{2n-3} \ldots P_5P_3G_1$$

$$P=P_{2n+1}P_{2n-1}P_{2n-3} \ldots P_3P_1.$$

8. An adder as claimed in claim 7, wherein said carry lookahead circuit receives the carry generate signal $G_{j-1}$ and the carry propagate signal $P_{j-1}$ from each of said adder circuits and outputs a carry signal $C_j$ to the j-th adder circuit.

9. An adder as claimed in claim 8, wherein said carry signal $C_j$ is expressed by the following logical formula:

$$C_j=G_{j-i}+P_{j-1}C_{j-1}$$

wherein $C_0=C_{1N}$.

10. An adder as claimed in claim 7, wherein said carry lookahead circuit produces a carry generate signal $G_{total}$ and a carry propagate signal $P_{total}$ for all of the inputted binary signals to said adder by the following logical formula:

$$G_{total}=G_j+P_jG_{j-1}+ \ldots +P_jP_{j-1} \ldots P_2P_1G_0$$

$$P_{total}=P_jP_{j-1}P_{j-2} \ldots P_1P_0.$$

11. An adder as claimed in claim 6, wherein said first circuit means includes a plurality of arithmetic and logic arrays, each of which includes a current mode switching type transistor logic circuit having four switching type transistor logic circuits having four inputs for receiving the input bit signals $A_{2n+1}$, $A_{2n}$, $B_{2n+1}$, $B_{2n}$ and five outputs for outputting the $X_{2n}$, $X_{2n+1}$, $Y_{2n}$, $G_{2n+1}$ and $P_{2n+1}$, the current mode switching type transistor logic circuit including:

a first emitter-coupled transistor logic receiving the inputs $A_{2n}$ and $B_{2n}$ to provide through a first emitter follower a logical product $A_{2n}\cdot B_{2n}$;

a second emitter-coupled transistor logic of cascaded double-stage construction receiving the inputs $A_{2n}$ and $B_{2n}$ to output through a second emitter follower an exclusive logic sum $A_{2n}\oplus B_{2n}$;

a third emitter-coupled transistor logic of cascaded double-stage construction receiving the inputs $A_{2n+1}$ and $B_{2n+1}$ to supply through a third emitter follower an exclusive logical sum $A_{5n+1} \oplus B_{2n+1}$;

the outputs of this third logic and the second logic being an emitter dotting which constitutes an AND gate for outputting a logic result $(A_{2n+1} \oplus B_{2n+1}) \cdot (A_{2n} \oplus B_{2n})$, a fourth emitter-coupled transistor logic of cascaded double-stage arrangement receiving the inputs $A_{2n+1}$ and $B_{2n+1}$ to produce a logical product $A_{2n+1} \cdot B_{2n+1}$, which is in turn connected to a fourth emitter follower coupled with a fifth emitter follower which receives the outputs of the second and third emitter-coupled logics so that the logical result $A_{2n+1} \cdot B_{2n+1} + (A_{2n+1} \oplus B_{2n+1}) A_{2n} \cdot B_{2n}$, can be obtained, and wherein the second circuit means including a plurality of AND-OR gate circuits of the collector-dot type, each of which includes a plurality of AND gates receiving the corresponding output of the first circuit means and an OR gate receiving the outputs of the AND gates, each of the AND gate circuits being composed to an emitter-coupled logic gate and the OR gate being constituted of a collector dotting having a transistor whose base is connected commonly to the collectors of the output transistors of all the AND gates.

12. An adder circuit for connection to a source of input signals and a source of external carry signals comprising:

first circuit means connected to receive first and second binary input signals A and B from said source of input signals, each of said signals corresponding to a certain bit length (M+1) of binary data, for producing parallel output signals;

second circuit means connected to receive the output signals from said first circuit means and an external carry signal from the source of external carry signals for producing internal carry signals;

third circuit means coupled to receive the parallel output signals from said first circuit means and the internal carry signals from said second circuit means for producing the result of the addition of said first and second binary input signals taking account of said external carry signal for each bit position thereof; and said adder circuit being characterized in that (a) said first circuit means comprises a plurality of arithmetic and logical circuits each receiving two pairs of the input bit signals ($A_{2n+1}$, $A_{2n}$, $B_{2n+1}$, $B_{2n}$) which correspond to the contents of the two adjacent bits of said input binary signals and producing output signals $G_{2n+1}$, $P_{2n+1}$, $X_{2n+1}$, $X_{2n}$ and $Y_{2n}$ of the following logical formula:

$$G_{2n+1} = A_{2n+1} B_{2n+1} + (A_{2n+1} \oplus B_{2n+1}) \cdot A_{2n} B_{2n}$$

$$P_{2n+1} = (A_{2n+1} \oplus B_{2n+1}) \cdot (A_{2n} \oplus B_{2n})$$

$$X_{2n+1} = A_{2n+1} \oplus B_{2n+1}$$

$$X_{2n} = A_{2n} \oplus B_{2n}$$

$$Y_{2n} = A_{2n} \cdot B_{2n}$$

Wherein 2n=0, 2, 4, . . . , (M−1) and 2n+1=1, 3, . . . , M; and (b) said third circuit means includes an Exclusive-OR circuit which receives one corresponding output $X_i$ from said first circuit means and the internal carry signal $C_i$ from a corresponding unit of said second circuit means so as to produce the sum signal $S_i$ for the addition of said first and second binary signals for the $i^{th}$ bit position thereof, said sum signal $S_i$ being expressed by the following logical formula:

$$S_i = X_i \oplus C_i.$$

13. An adder circuit as claimed in claim 12, wherein said second circuit means produce carry signal $C_{2n}$ or $C_{2n+1}$ for each bit position of said first and second binary signals, said signals $C_{2n}$ and $C_{2n+1}$ being expressed by the following logical formula.

$$\begin{aligned} C_{2n} &= G_{2n-1} + P_{2n-1}G_{2n-3} + \\ &\quad P_{2n-1}P_{2n-3}G_{2n-5} + \ldots + \\ &\quad P_{2n-1}P_{2n-3} \ldots P_3G_1 + \\ &\quad P_{2n-1}P_{2n-3} \ldots P_3P_1C_{1N} \\ C_{2n+1} &= Y_{2n} + X_{2n}G_{2n-1} + \\ &\quad X_{2n}P_{2n-1}G_{2n-3} + \ldots + \\ &\quad X_{2n}P_{2n-1}P_{2n-3} \ldots P_3G_1 + \\ &\quad X_{2n}P_{2n-1}P_{2n-3} \ldots P_3P_1C_{1N} \end{aligned}$$

wherein $C_0 = C_{1N} = G_{-1}$ and $C_1 = Y_0 + X_0C_{1N}$.

14. An adder circuit as claimed in claim 13, wherein the second circuit means produce a carry generate signal G and a carry propagate signal P of the following formula.

$$G = G_{2n+1} + P_{2n+1}G_{2n-1} + P_{2n+1}P_{2n-1}G_{2n-3} + \ldots + P_{2n+1}P_{2n-1}P_{2n-3} \ldots P_5P_3G_1$$

$$P = P_{2n+1}P_{2n-1}P_{2n-3} \ldots P_3P_1.$$

15. An adder circuit as claimed in claim 13, wherein each of said arithmetic and logical circuits includes AND gates and OR gates which are constituted of current mode transistor switching circuits and which assembled to receive input signals $A_{2n+1}$, $A_{2n}$, $B_{2n+1}$ and $B_{2n}$ so as to generate five outputs $G_{2n+1}$, $P_{2n+1}$, $X_{2n+1}$, $X_{2n}$ and $Y_{2n}$.

16. An adder circuit as claimed in claim 13, wherein said first circuit means includes a plurality of arithmetic and logic arrays, each of which includes a current mode switching type transistor logic circuit having four switching type transistor logic circuits having four inputs for receiving the input bit signals $A_{2n+1}$, $A_{2n}$, $B_{2n+1}$, $B_{2n}$ and five outputs for outputting the $X_{2n}$, $X_{2n+1}$, $Y_{2n}$, $G_{2n+1}$ and $P_{2n+1}$, the current mode switching type transistor logic circuit including:

a first emitter-coupled transistor logic receiving the inputs $A_{2n}$ and $B_{2n}$ to provide through a first emitter follower a logical product $A_{2n} \cdot B_{2n}$;

a second emitter-coupled transistor logic of cascaded double-stage construction receiving the inputs $A_{2n}$ and $B_{2n}$ to output through a second emitter follower an exclusive logic sum $A_{2n} \oplus B_{2n}$;

a third emitter-coupled transistor logic of cascaded double-stage construction receiving the inputs $A_{2n+1}$ and $B_{2n+1}$ to supply through a third emitter follower an exclusive logical sum $A_{2n+1} \oplus B_{2n+1}$;

the outputs of this third logic and the second logic being an emitter dotting which constitutes an AND gate for outputting a logic result $(A_{2n+1} \oplus B_{2n+1}) \cdot (A_{2n} \oplus B_{2n})$, a fourth emitter-coupled transistor logic of cascaded double-stage arrangement receiving the inputs $A_{2n+1}$ and $B_{2n+1}$ to produce a logical product $A_{2n+1} \cdot B_{2n+1}$, which is in turn connected to a fourth emitter follower coupled with a fifth emitter follower which receives the outputs of the second and third emitter-coupled logics so that the logical result $A_{2n+1} \cdot B_{2n+1} + (A_{2n+1} \oplus B_{2n+1})\ A_{2n} \cdot B_{2n}$, can be obtained, and wherein the second circuit means including a plurality of AND-OR gate circuits of the collector-dot type, each of which includes a plurality of AND gates receiving the corresponding output of the first circuit means and an OR gate receiving the outputs of the AND gates, each of the AND gate circuits being composed to an emitter-coupled logic gate and the OR gate being constituted of a collector dotting having a transistor whose base is connected commonly to the collectors of the output transistors of all the AND gates.

17. An adder for connection to a source of input signals and a source of external carry signals which comprises:

a plurality of adder circuits each for receiving from said source of input signals first and second binary signals of (M+1) bit length each corresponding to a certain bit portion of the addend and augend and for producing the result of the addition of said first and second binary signals for each bit portion and a carry generate signal $G_i$ and a carry propagate signal $P_i$; and, a carry look-ahead circuit coupled to said adder circuits;

each of said adder circuits comprising:

first circuit means connected to receive first and second binary input signals A and B from said source of input signals, each of said signals corresponding to a certain bit length (M+1) of binary data, for producing parallel output signals;

second circuit means receiving the output signals from said first circuit means and an external carry signal from the source of external carry signals for producing internal carry signals;

third circuit means coupled to receive the parallel output signals from said first circuit means and the internal carry signals from said second circuit means for producing the result of the addition of said first and second binary input signals taking account of said external carry signal for each bit position thereof; and said adder circuit being characterized in that (a) said first circuit means comprises a plurality of arithmetic and logical circuits each receiving two pairs of the input bit signals ($A_{2n+1}$, $A_{2n}$, $B_{2n+1}$, $B_{2n}$) which correspond to the contents of the two adjacent bits of said input binary signals and producing output signals $G_{2n+1}$, $P_{2n+1}$, $X_{2n+1}$, $X_{2n}$ and $Y_{2n}$ of the following logical formula;

(b) said second circuit means produce carry signal $C_{2n}$ or $C_{2n+1}$ for each bit position of said first and second binary signals, said signals $C_{2n}$ and $C_{2n+1}$ being expressed by the following logical formula:

$$C_{2n} + G_{2n-1} + P_{2n-1}G_{2n-3} + P_{2n-1}P_{2n-3}G_{2n-5} + \ldots + P_{2n-1}P_{2n-3} \ldots P_3G_1 + P_{2n-1}P_{2n-3} \ldots P_3P_1C_{1N}$$

-continued $$C_{2n+1} = Y_{2n} + X_{2n}G_{2n-1} + X_{2n}P_{2n-1}G_{2n-3} + \ldots + X_{2n}P_{2n-1}P_{2n-3} \ldots P_3G_1 + X_{2n}P_{2n-1}P_{2n-3} \ldots P_3P_1C_{1N}$$

wherein $C_O = C_{IN} = G_{-1}$ and $C_1 = Y_O + X_OC_{IN}$; and (c) said third circuit means produce the sum signal $S_i$ for the addition of said first and second binary signals for the i bit position thereof, said sum signal $S_i$ being expressed as follows:

$$S_i = X_i \oplus C_i.$$

18. An adder as claimed in claim 17, wherein the second circuit means produce a carry generate signal G and a carry propagate signal P of the following logical formula:

$$G = G_{2n+1} + P_{2n+1}G_{2n-1} + P_{2n+1}P_{2n-1}G_{2n-3} + \ldots + P_{2n+1}P_{2n-1}P_{2n-3} \ldots P_5P_3G_1$$

$$P = P_{2n+1}P_{2n-1}P_{2n-3} \ldots P_3P_1.$$

19. An adder as claimed in claim 18, wherein said carry lookahead circuit receives the carry generate signal $G_j$ and the carry propagate signal $P_j$ from each of said adder circuits and outputs a carry signal $C_j$ to the j-th adder circuit.

20. An adder as claimed in claim 19, wherein said carry signal $C_j$ is expressed by the following logical formula:

$$C_j = G_{j-1} + P_{j-1}C_{j-1}$$

But, $C_0 = C_{1N}$.

21. An adder as claimed in claim 18, wherein said carry lookahead circuit produces a carry generate signal $G_{total}$ and a carry propagate signal $P_{total}$ for all of the inputted binary signals to said adder by the following logical formula:

$$G_{total} = G_j + P_jG_{j-1} + \ldots + P_jP_{j-1} \ldots P_2P_1G_0$$

$$P_{total} = P_jP_{j-1}P_{j-2} \ldots P_1P_0.$$

22. An adder as claimed in claim 17, wherein said first circuit means includes a plurality of airthmetic and logic arrys, each of which includes a current mode switching type transistor logic circuit having four switching type transistor logic circuits having four inputs for receiving the input bit signals $A_{2n+1}$, $A_{2n}$, $B_{2n+1}$, $B_{2n}$ and five outputs for outputting the $X_{2n}$, $X_{2n+1}$, $Y_{2n}$, $G_{2n+1}$ and $P_{2n+1}$, the current mode switching type transistor logic circuit including:

a first emitter-coupled transistor logic receiving the inputs $A_{2n}$ and $B_{2n}$ to provide through a first emitter follower a logical product $A_{2n} \cdot B_{2n}$;

a second emitter-coupled transistor logic of cascaded double-stage construction receiving the inputs $A_{2n}$ and $B_{2n}$ to output through a second emitter follower an exclusive logic sum $A_{2n} \oplus B_{2n}$;

a third emitter-coupled transistor logic of cascaded double-stage construction receiving the inputs $A_{2n+1}$ and $B_{2n+1}$ to supply through a third emitter follower an exclusive logical sum $A_{2n+1} \oplus B_{2n+1}$;

the outputs of this third logic and the second logic being an emitter dotting which constitutes an AND gate for outputting a logic result $(A_{2n+1} \oplus B_{2n+1}) \cdot (A_{2n} \oplus B_{2n})$, a fourth emitter-coupled transistor logic of cascaded double-stage arrangement receiving the inputs $A_{2n+1}$ and $B_{2n+1}$ to produce a logical product $A_{2n+1} \cdot B_{2n+1}$, which is in turn connected to a fourth emitter follower coupled with a fifth emitter follower which receives the outputs of the second and third emitter-coupled logics so that the logical result $A_{2n+1} \cdot B_{2n+1} + (A_{2n+1} \oplus B_{2n+1})$, $A_{2n} \cdot B_{2n}$, can be obtained, and wherein the second circuit means including a plurality of AND-OR gate circuits of the collector-dot type, each of which includes a plurality of AND gates receiving the corresponding output of the first circuit means and an OR gate receiving the outputs of the AND gates, each of the AND gate circuits being composed to an emitter-coupled logic gate and the OR gate being constituted of a collector dotting having a transistor whose base is connected commonly to the collectors of the output transistors of all the AND gates.

* * * * *

UNITED STATES PATENT AND TRADEMARK OFFICE
CERTIFICATE OF CORRECTION

PATENT NO. : 4,764,886

DATED : 8/16/88

INVENTOR(S) : Yano

It is certified that error appears in the above-identified patent and that said Letters Patent is hereby corrected as shown below:

Column 6, line 25, delete "$B_{2n+1}$=", insert --$G_{2n+1}$=--;

Column 7, line 52, delete "$A_{2n+1} \cdot B_{B2n+1}$ +", insert --$A_{2n+1}$·B2n+1 +--

Column 12, line 51, delete "$A_{5n+1}$", insert --$A_{2n+1}$--;

Column 14, line 7, delete "$Y_o + X_o + X_o$", insert --$Y_o + X_o$--;

Column 15, line 2, delete "$A_{5n+1}$", insert --A2n+1--;

Column 18, line 35, delete "$G_{j-1}$--, insert --$G_{j-i}$--;

line 51, delete "arrys", insert --arrays--

Signed and Sealed this

Fifteenth Day of October, 1991

*Attest:*

HARRY F. MANBECK, JR.

*Attesting Officer* *Commissioner of Patents and Trademarks*